March 21, 1950 — A. H. PAPE — 2,501,085
BAIT-CLAMPING FISHHOOK
Filed Sept. 10, 1945
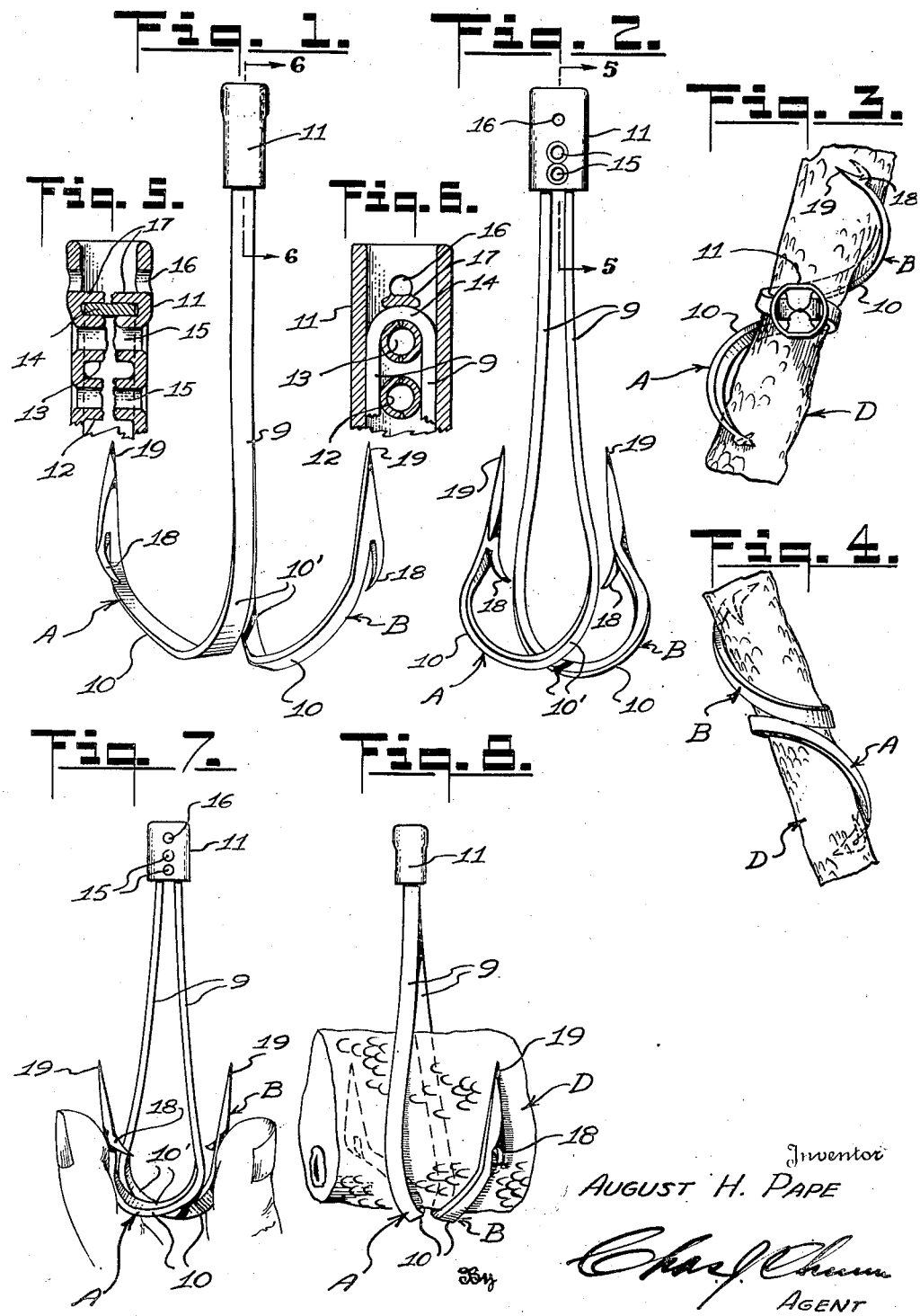
Inventor
AUGUST H. PAPE
AGENT Patented Mar. 21, 1950

2,501,085

UNITED STATES PATENT OFFICE 2,501,085

BAIT-CLAMPING FISHHOOK

August H. Pape, Kentfield, Calif., assignor of one-half to C. J. Grieder, San Francisco, Calif.

Application September 10, 1945, Serial No. 615,251

4 Claims. (Cl. 43—44.4)

This invention has for its primary object to provide a fish hook in which the bait is held in such a way that it will not be dislodged and lost when casting the line to which the hook is attached.

Another object is to provide a dual fish hook unit in which the bait instead of being pierced by the hook in the ordinary manner is resiliently clamped and securely held between the shanks of the two hooks while being embraced by and also clamped between the bills of the hooks thereby assuring that the bait will remain in place at all times except when the bait and hook are taken by the fish.

A further object is to provide a fish hook such as described in which the barbs of the hooks cooperate with the shanks and bills to hold the bait in place without requiring that the sharp points of the hooks pierce the bait or causing said points to be disposed in position in which they would fail to hook the fish when the bait is taken or struck by the fish.

Another object is to provide a dual fish hook of the character described in which resilient shanks of the hooks are opposed and connected at their outer ends and the bills of the hooks are extended in opposite directions and crossed whereby with the shanks there is provided a bait-clamping loop which may be enlarged to receive the bait by forcing the bills together and will resiliently clamp and hold the bait when the bills are released by the operator.

Yet another object of the invention is to provide a dual hook such as described which if desired may be conveniently made from a single piece of steel or other resilient wire.

Another object of the invention is to provide a dual hook such as described in which the outer ends of the two shanks are mounted in a sleeve formed and mounted in place so that it is securely held against removal and will hold the two shanks in proper position, also afford a ready connection of the fishing line to the hook unit.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is an elevational view of a dual hook embodying my invention;

Fig. 2 is an elevational view of the dual hook taken at right angles to Fig. 1;

Fig. 3 is a top plan view of the hook showing the bait clamped therein;

Fig. 4 is a bottom plan view of the hook with the bait held thereby;

Fig. 5 is an enlarged fragmentary sectional view taken on the line 5—5 of Fig. 2;

Fig. 6 is an enlarged fragmentary sectional view taken on the line 6—6 of Fig. 1;

Fig. 7 is a side view of the hook showing the manner of forcing the bills together to spread the shanks apart for insertion of the bait therebetween;

Fig. 8 is a side elevation of the hook taken at right angles to Fig. 7 and as it appears with the bait clamped therein.

Referring to the drawing more specifically, A and B designate like fish hooks of special formation in accordance with my invention and which as here shown are formed of a single piece of suitable resilient metal, but could, as is obvious, be formed as separate hooks provided they are connected at the free ends of their shanks 9 so that such shanks are opposed and extended somewhat divergently toward the bills 10.

In accordance with my invention the bills 10 of the hooks 9 extend side by side and outwardly in opposite directions from the shanks with the portions 10' of the bills which are adjacent the juncture of the bills and shanks arranged to cross one another as best shown in Fig. 2. With this arrangement of the shanks and bills there is formed an elongated loop C in which the bait may be clamped and held as shown in Figs. 3, 4 and 8.

Whether the two hooks A and B are made as separate hooks or from a single piece of resilient flat wire as here shown (or of round wire) I prefer to use a sleeve or ferrule 11 which is fitted tightly or pressed onto the shanks 9 of the hooks. This sleeve, as shown in Figs. 5 and 6, is punched through to form therein tubular rivet members 12 and 13 which extend between the shanks in inwardly spaced relation to the web or joint portion 14 of the two shanks. In forming these punched-in portions 12 and 13 eyes or openings are formed whereby a fishing line may be secured to the hook unit hereof. Other openings 16 are formed adjacent the outer end of the sleeve 11 so that lug portions 17 project inwardly to lie upon the outer side of the joint portion 14 as shown in Figs. 5 and 6. In fastening the sleeve to the shanks 9 it is pressed and punched so that the metal thereof forming the portions 12, 13 and 17 will forcibly bear against the shanks and the joint portion 14 to securely anchor the sleeve to the shank.

With reference to Fig. 7 it is seen that in order to open the bait-clamping loop C for reception of bait, the operator grasps the two bills 10 between the thumb and first finger and forces them together, inserts the bait D and then lets go of the two bills. The dual hook is tensioned so that the shanks and bills will tend to spring from position shown in Fig. 7 back to position shown in Fig. 2 thereby causing the shanks and bills to clamp the bait D therebetween with the bait resting in the bills and the free end portions of the bills pressing against opposite sides of the bait. These free end portions are twisted somewhat spirally and the barbs 18 are disposed so that they will bite into the bait while the sharp pointed ends 19 lie against the bait. The bills 10 as a whole are twisted helically as shown in Figs. 3 and 4 better to encompass and hold the bait. Thus the barbs assist in holding the bait without requiring that the sharp ends 19 pierce the bait.

With the bait resiliently clamped between the shanks 9 and bills 10, as shown in Figs. 3, 4 and 8, it is prevented from being dislodged when casting or when the line is in swift water, but is effectively presented to the fish with the dual hooks disposed to hook the fish when the bait is taken.

The pointed ends 19 of the hooks curve somewhat inwardly toward the shanks and therefore with the bills 10 and portions of the shanks 9 adjacent said bills, substantially embrace and partially encircle the bait while also clamping it under spring tension to prevent accidental dislodgement and loss of the bait.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a dual fish hook, a pair of like fish hooks each comprising a comparatively straight shank and a bill portion integral with one end of the shank, and means joining the other ends of said shanks for attachment to a fishing line, said shanks being disposed in spaced opposed relation, said bills having barbed points and being crossed and extended in opposite directions and provided with a helical twist from said shanks to said points so as to embrace a piece of bait clamped between said shanks.

2. A dual fish hook comprising a pair of like fish hooks each formed of a piece of flat resilient wire and having a comparatively straight shank and a bill portion integral with one end of said shank and provided with a barbed point; and means joining the other ends of said shanks for attachment to a fishing line, said shanks having their flat sides opposed to one another and adapted to be spread apart to clamp therebetween a piece of bait, said bill portions crossing one another and extending outwardly in opposite directions and being provided with a helical twist so that they will extend around a piece of bait clamped between the shanks.

3. In a bait clamp fishing hook, a pair of fish hooks having substantially straight shanks joined to one another at the ends which are adapted to be attached to a fishing line, and bill portions at the other ends of said shanks having barbed points and being provided with a helical twist so as to embrace a piece of bait which is held between said shanks.

4. In a dual fishing hook, a pair of shanks arranged in opposed relation to one another and a joint portion integrally connecting certain ends of said shanks; and a sleeve fitted over said shanks and having inwardly struck portions lying on opposite sides of said joint portion of said shanks for holding the sleeve in place, there being openings in said sleeve on opposite sides of said joint portion affording the attachment thereof to a fishing line.

AUGUST H. PAPE.

REFERENCES CITED

The following references are of record in the file of this patent:

UNITED STATES PATENTS

| Number | Name | Date |
|---|---|---|
| 1,312,734 | Jones | Aug. 12, 1919 |
| 1,372,900 | Olinger | Mar. 29, 1921 |
| 2,124,263 | Schott | July 19, 1938 |
| 2,247,806 | Foley | July 1, 1941 |
| 2,345,197 | Hirsch et al. | Mar. 28, 1944 |

FOREIGN PATENTS

| Number | Country | Date |
|---|---|---|
| 336,483 | France | Jan. 16, 1904 |